UNITED STATES PATENT OFFICE.

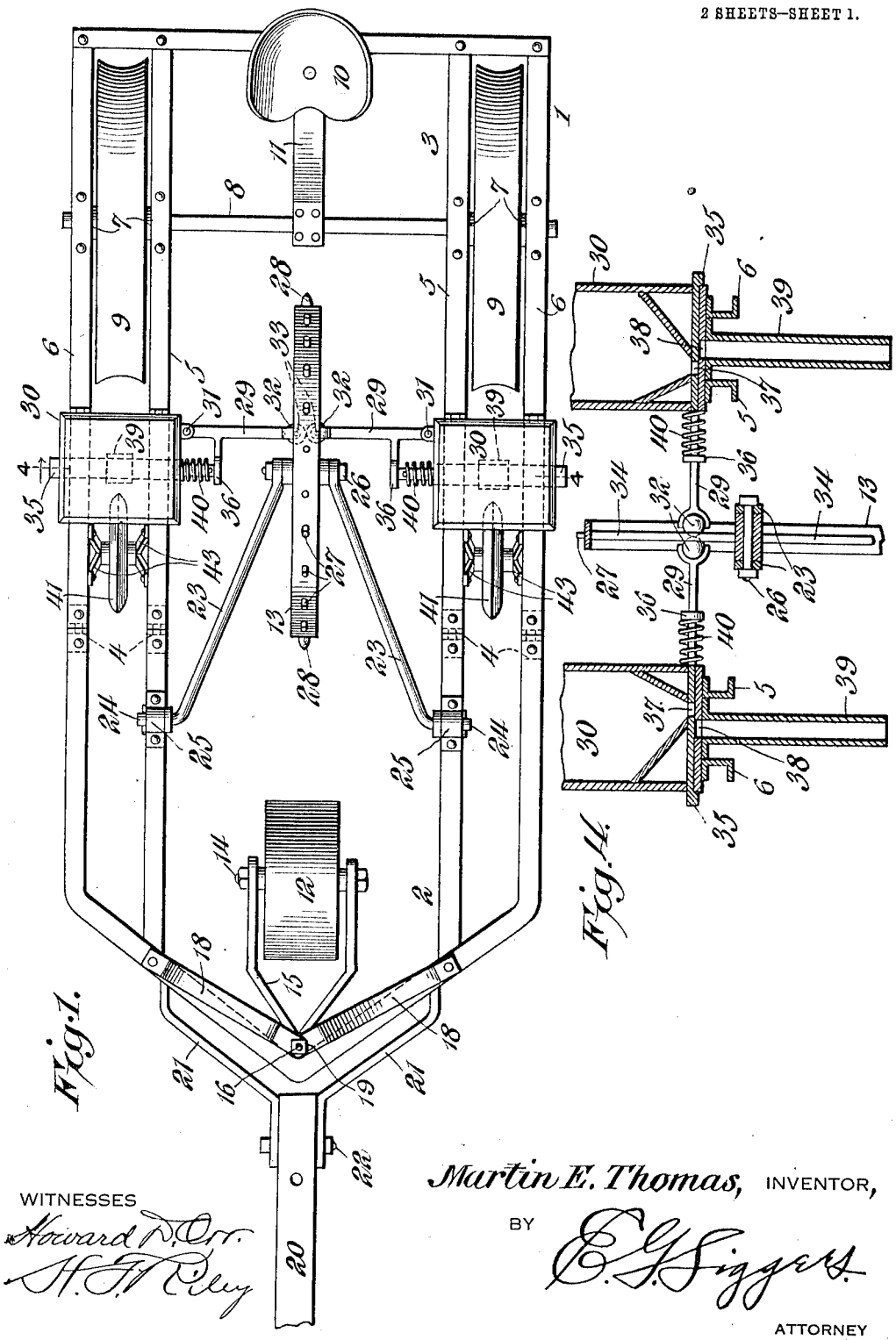

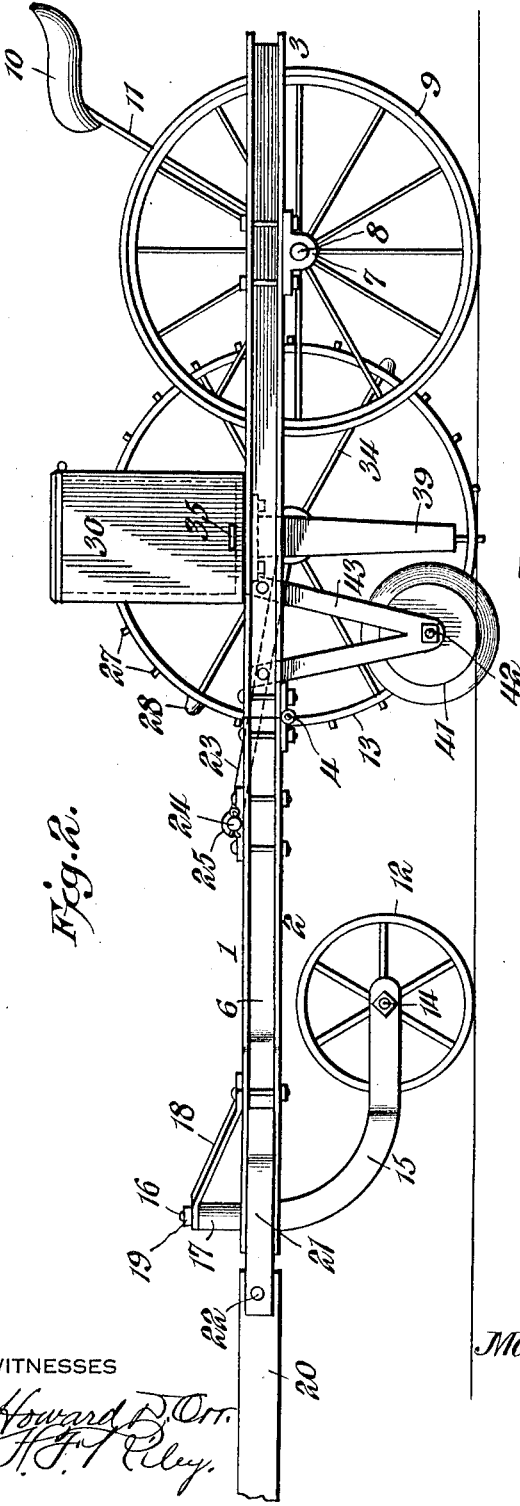

MARTIN E. THOMAS, OF BOWLING GREEN, KENTUCKY, ASSIGNOR OF ONE-FOURTH TO ELMER CARTER, ONE-FOURTH TO WILLIAM O. RODES, AND ONE-FOURTH TO MILT TAYLOR, ALL OF BOWLING GREEN, KENTUCKY.

CHECK-ROW CORN-PLANTER.

1,064,028.        Specification of Letters Patent.    Patented June 10, 1913.

Application filed March 9, 1911.  Serial No. 613,338.

*To all whom it may concern:*

Be it known that I, MARTIN E. THOMAS, a citizen of the United States, residing at Bowling Green, in the county of Warren and State of Kentucky, have invented a new and useful Check-Row Corn-Planter, of which the following is a specification.

The invention relates to a wireless check row corn planter.
The object of the present invention is to improve the construction of check row corn planters, and to provide a simple, durable and efficient corn planter of this type, equipped with marking and seed dropping mechanism and to arrange the parts so as to afford the operator a clear view of the hills and to enable the planter to be controlled by the weight of the driver to elevate the furrow opener clear of the soil to facilitate turning the machine at the end of a row.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a check row corn planter, constructed in accordance with this invention. Fig. 2 is a side elevation of the same. Fig. 3 is a central longitudinal vertical sectional view with parts in elevation, the frame of the corn planter being broken at the hinge joint to elevate the furrow opener. Fig. 4 is a transverse sectional view on the line 4—4 of Fig. 1.

Like numerals of reference designate corresponding parts in all the figures of the drawings.
In the accompanying drawings in which is illustrated the preferred form of the invention, the planter, which is designed for planting corn, cotton, and other seed, is equipped with a main frame 1, preferably constructed of channel iron, or other flange material and consisting of front and rear sections 2 and 3, connected together by transversely alined hinges 4, located at the lower faces or edges of longitudinal bars or beams 5 and 6 to permit the frame to break and be elevated at an intermediate point between its front and rear ends, as illustrated in Fig. 3 of the drawings. The frame is preferably composed of the longitudinal bars 5 and 6, arranged in pairs at opposite sides of the machine and suitably connected at their front and rear ends, but it may be constructed in any other desired manner. The rear section of the frame of the machine is equipped with transversely alined bearings 7, bolted or otherwise secured to the lower faces or edges of the spaced longitudinal beams and receiving a transverse axle 8 upon which is mounted wheels 9, having broad concave peripheries for covering the seed. The wheels rotate freely and the spindles of the axle 8 are preferably fixed to the frame and constitute a support for a seat 10, having a spring standard 11 bolted or otherwise secured to the axle 8 at the center thereof.

The front section of the frame is preferably tapered at its front end, as shown, and it is supported by a caster wheel 12, having a broad periphery and operating as a roller to roll a smooth track in front of a combined operating and marking wheel 13. The caster wheel is mounted on a transverse shaft or axle 14 in a bifurcated stem or standard 15, which is provided with an upper pivot portion 16, mounted in a bearing sleeve 17, suitably secured at its lower ends to the main frame and braced at its upper end by inclined bars 18, having their upper ends overlapped and pierced by the pivot 16, and bolted or otherwise secured at their lower ends to the frame of the machine. The upper end of the pivot may be threaded for the reception of a nut 19. A tongue 20 is connected with the front of the frame by rearwardly diverging arms or bars 21, suitably secured at their rear ends to the front of the frame of the machine, and having their front ends extended forward and secured to the side faces of the tongue by a transverse bolt 22.

The combined caster wheel and roller is located centrally of the front portion of the machine, and the combined marking and operating wheel, which is located in rear of the caster wheel, is arranged at the center of the machine and is connected with the front section thereof by a hanger, consisting of rearwardly converging arms 23, having their front terminals 24 bent laterally to form pivots, which are arranged in suitable bearings 25 of the front section of the frame. The rear ends of the arms 23 are pierced by a bolt 26, which forms the shaft or pivot upon which the marker wheel is mounted. The bolt 26, which passes through the hub of the marker wheel, may be of any preferred construction, and the pivot connection at the front and rear ends of the sides or arms 23 of the hanger permit the combined operating and marking wheel to move upwardly and downwardly to conform to the configuration of the soil, and also to arrange its spurs 27 and marking projections 28 clear of the ground, so that the marking wheel may be rotated for setting it to correspond with the marks of a previous row. The spurs or projections 27 are shorter than the markers or hill marking projections 28, and they insure a positive engagement of the wheel 13 with the soil and a uniform rotation for actuating seed slide operating levers 29.

The seed slide operating levers 29, which are located at diametrically opposite points, are disposed transversely of the machine at opposite sides of the wheel 13 at a point slightly in rear of the vertical plane of the axis of the said wheel, and they are pivoted at their outer ends to seed hoppers 30 by pins 31, or other suitable pivots. They are equipped at their inner ends with anti-friction devices 32, preferably consisting of balls or wheels mounted on vertical pivots 33 and arranged in forks or bifurcations of the inner ends of the levers in the path of spokes 34 of the combined operating and marking wheel 13. The spokes operate as tappets and engage the anti-friction device 32 and swing the levers forwardly in a horizontal plane for actuating seed slides 35. The levers 29 are provided at points intermediate of their ends with forwardly projecting arms 36, having enlarged ends and arranged to engage the inner ends of the seed slides 35, whereby the latter are moved outwardly for carrying their seed cups 37 from outlets 38 in the bottom of the hopper to seed spouts 39. The seed slides reciprocate transversely of the hoppers and are moved inwardly by coiled springs 40, disposed on the inner end portions of the seed slides and bearing against the inner side walls of the hoppers. The springs 40 are suitably secured to the inner ends of the seed slides. The hoppers are preferably provided with partitions for directing their contents to the outlets 38, but the seed slides and hoppers may be of any preferred construction.

The hoppers are suitably mounted upon the spaced side beams of the frame of the machine, and are carried by the rear section 3 of the frame, and the seed spouts 39 are located in rear of the furrow openers 41, preferably consisting of disks mounted on suitable axles or pivots 42 and carried by approximately V-shaped hangers or standards 43, but they may be mounted in any other desired manner. The V-shaped hangers or standards 43 are secured to the spaced side beams at points in advance of the seed hoppers 30.

In operating the planter a portion of the weight of the operator is supported by the rear axle 8, which is located in advance of the seat in convenient position for receiving the legs of the driver or operator. When it is desired to turn the machine at the end of a row, the operator transfers his feet from the axle to the rear end of the frame, throwing his weight upon the latter and causing the frame to break at the hinges of the sections, thereby elevating the furrow openers 41, which are mounted at the front portion of the rear section of the frame. The furrow openers are elevated clear of the soil and the machine may be readily turned. After turning the machine, the operator again places his feet upon the axle and permitting the sections of the frame to return to their normal horizontal position. The axle forms a pivot or fulcrum on which the rear frame may be readily tilted. The hill marking devices or projections are arranged to make distinct marks at a point centrally between the two hills, and the smooth track or path rolled by the caster wheel enables the hill marks to be distinctly seen, so that the machine may be easily and accurately set.

Having thus fully described my invention, what I claim as new and desire to secure by Letters Patent, is:—

1. A planter comprising a frame composed of front and rear sections hinged together and arranged to break at a point intermediate of the ends of the frame, a furrow opener carried by the rear section of the frame, seed dropping mechanism arranged in rear of the furrow opener and also carried by the said rear sections, and wheels supporting the sections of the frame and including an axle connected with the rear section of the frame at a point intermediate of the ends thereof and forming a fulcrum for the rear section, which is adapted to be tilted by the weight of the operator to lift the furrow opener and the seed dropping mechanism clear of the ground.

2. A planter comprising a frame composed of front and rear sections hinged together and arranged to break at a point intermediate of the ends of the frame, a furrow opener carried by the rear section of the frame, seed dropping mechanism arranged in rear of the furrow opener and also carried by the said rear sections, wheels supporting the front and rear sections of the frame and including an axle mounted on the rear section of the frame and forming a fulcrum or pivot for the same, and a seat having a standard secured to the axle, said seat being arranged in rear of the axle and permitting the operator to shift his weight rearwardly for tilting the rear section of the frame to raise the furrow opener and the seed dropping mechanism clear of the ground.

3. A planter comprising a frame composed of front and rear sections hinged together and arranged to break at the center, an axle secured to the rear section, wheels located at opposite sides of the frame and secured to the axle and supporting the rear section, a caster wheel arranged centrally of the front portion of the frame and supporting the front section, a seat arranged at the rear portion of the frame in position to permit the operator to shift his weight for tilting the rear section, furrow openers on the rear section of the frame and located in advance of the rear wheels, and seed dropping mechanism.

4. A planter comprising a frame composed of front and rear sections hinged together, an axle mounted on the rear section of the frame and forming a fulcrum for the same, covering wheels arranged on the ends of the axle at opposite sides of the frame, furrow openers carried by the rear section of the frame and located in advance of the covering wheels, seed dropping mechanism arranged in rear of the furrow openers, a caster wheel supporting the front section of the frame and having a flat periphery arranged to roll a smooth path or track, and a combined hill marking and operating wheel located in rear of the caster wheel and arranged to actuate the seed dropping mechanism and having hill marking devices operating in the said smooth path or track.

5. A planter including a frame, a combined roller and caster wheel supporting the front of the frame and having a broad periphery arranged to roll a smooth track or path, and a marker wheel arranged in rear of the caster wheel and having hill marking devices operating on the smooth track or path made by the caster wheel.

6. A planter comprising a frame, a caster wheel having a broad periphery and forming a roller for making a smooth track or path, seed dropping mechanism, and a combined hill marking and operating wheel arranged in rear of the caster wheel and actuating the seed dropping mechanism and provided with peripheral hill marking projections operating in the smooth track or path made by the caster wheel.

7. A planter comprising a frame, a caster wheel having a broad periphery and forming a roller for making a smooth track or path, seed dropping mechanism, and a combined hill marking and operating wheel arranged in rear of the caster wheel and actuating the seed dropping mechanism and provided at its periphery with relatively small soil engaging projections and having relatively large hill marking projections arranged at intervals and operating in the smooth track or path made by the caster wheel.

8. A planter including a frame composed of front and rear sections hinged together and arranged to break at a point intermediate of the ends of the frame, wheels supporting the sections of the frame and arranged to permit the same to tilt, opposite seed dropping mechanism mounted on the rear frame, a combined operating and hill marking wheel located between and arranged to actuate the seed dropping mechanism, and a hanger carrying the said wheel and pivotally connected with the same and with the front section of the said frame and permitting the wheel to swing upward and downward freely.

In testimony, that I claim the foregoing as my own, I have hereto affixed my signature in the presence of two witnesses.

MARTIN E. THOMAS.

Witnesses:
J. T. DISHMAN,
C. M. HURD.

---

Copies of this patent may be obtained for five cents each, by addressing the "Commissioner of Patents. Washington, D. C."